June 7, 1960 W. C. WHITTUM ET AL 2,939,616
DOOR STRUCTURE FOR RUBBER MIXERS AND THE LIKE
Filed Jan. 21, 1958 4 Sheets-Sheet 1

INVENTOR
W. C. Whittum
O. W. MacLeod
BY
Rockwell Bartholow
ATTORNEYS

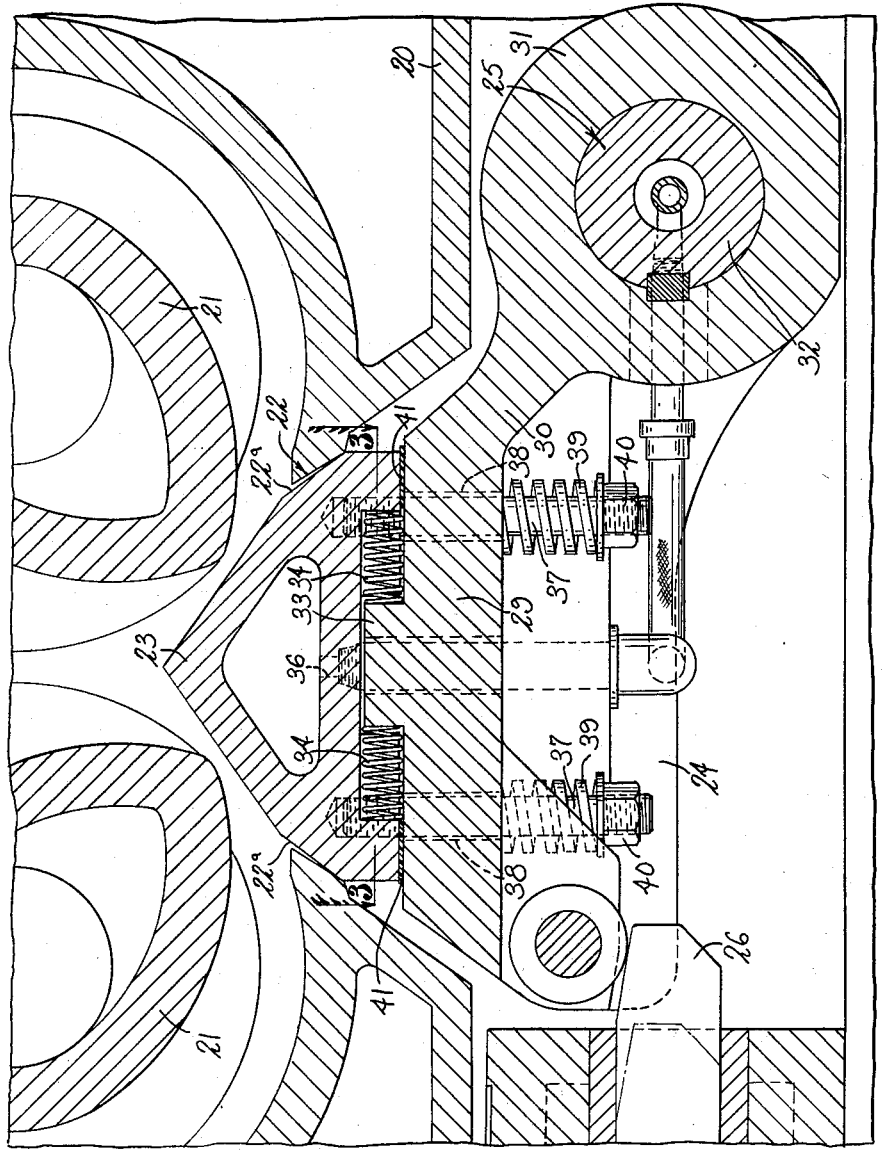

June 7, 1960 W. C. WHITTUM ET AL 2,939,616
DOOR STRUCTURE FOR RUBBER MIXERS AND THE LIKE
Filed Jan. 21, 1958 4 Sheets-Sheet 4
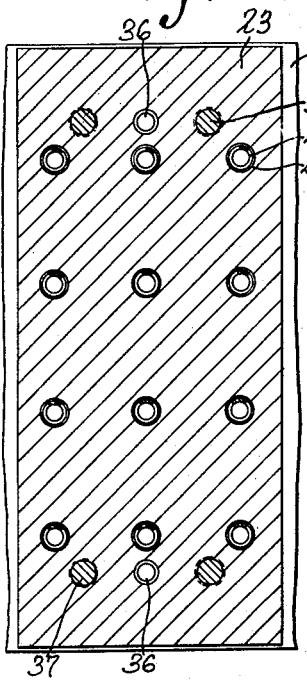
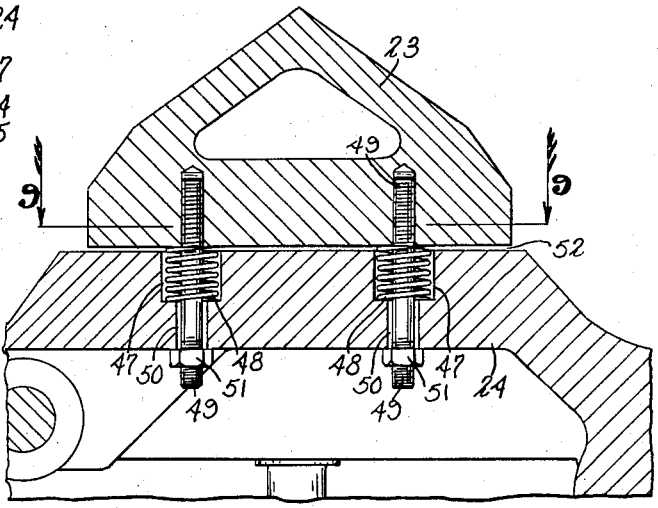
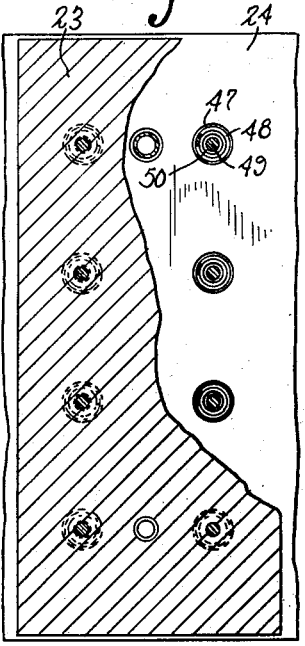
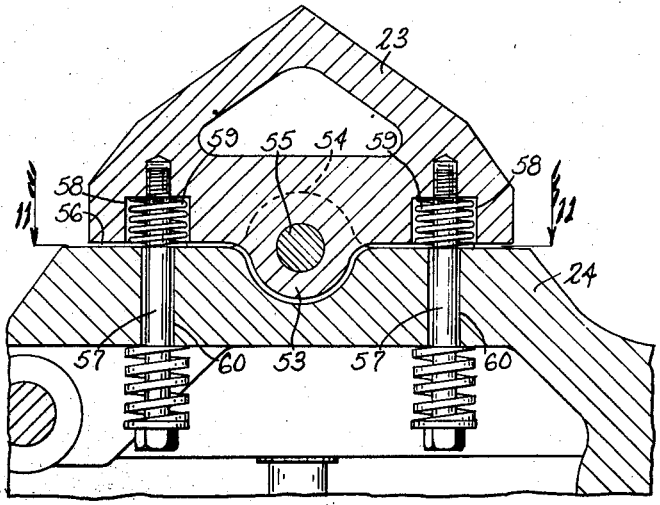
INVENTOR
W. C. Whittum
D. W. MacLeod
BY Rockwell & Bartholow
ATTORNEYS

United States Patent Office 2,939,616
Patented June 7, 1960

2,939,616

DOOR STRUCTURE FOR RUBBER MIXERS AND THE LIKE

Warren C. Whittum, Orange, and Douglas W. MacLeod, Ansonia, Conn., assignors to Farrel-Birmingham Company, Incorporated, Ansonia, Conn., a corporation of Connecticut Filed Jan. 21, 1958, Ser. No. 710,332

11 Claims. (Cl. 222—512)

This invention relates to door structure for mixers that plasticize rubber and other materials, and more particularly to so-called Banbury mixers, which have a pair of rotors and a bottom discharge door. The invention also relates especially to mixers of this kind in which the discharge door, when released from the closed position, swings downwardly on a laterally located pivotal mounting. When the door is closed it is swung upwardly so as to move into the door opening and engage the latter along the lateral edges of this opening which are below and in paarllelism to the rotors.

In the past the tight closing of the door has been a matter of some difficulty owing to the fact that through temperature changes and other changing conditions, the lateral edges of the door do not evenly engage the cooperating edges of the opening, thus permitting leakage or escape of material which is being mixed.

One of the objects of the present invention is to improve the door structure so that it is possible to have a fit of the door which will prevent the escape of material from the mixing chamber.

Another object is to improve the structure of a mixer having a lower pivotally mounted door, such door being of the kind having upwardly and inwardly sloping lower edge portions that cooperate with lateral boundaries of the doorway.

A still further object of the invention is to provide a structure of this kind wherein leakage from the mixing chamber is inhibited and in which the structure is easily handled, durable and compact and of a kind which can be produced at relatively low cost.

To these and other ends the invention consists in the novel features and combinations of parts to be hereinafter described and claimed.

In the accompanying drawings:

Fig. 2 is a vertical section transversely to the door showing on a larger scale certain of the parts shown in Fig. 1;

Fig. 7 is a section on line 7—7 of Fig. 6;

Fig. 8 is a further section similar to Fig. 4 showing another modification;

Fig. 9 is a section on line 9—9 of Fig. 8;

Fig. 10 is a further transverse section showing a modified assembly of door and door support.

The drawings illustrate a mixer of the Banbury type, as above mentioned, having a mixing chamber containing a pair of rotors, the casing providing the chamber having below and between the rotors a door opening with parallel lateral edge portions adapted to be engaged by upwardly and inwardly inclined surfaces provided at the lower part of a door that in transverse section has the form of an inverted V. This door is supported from beneath by a supporting member of the pivoted type, the pivot being below and somewhat to one side of one of the lateral edges of the door opening. The door, after being moved to its upper closed position, can be locked in that position by a power-operated locking member in the form of a bolt, and when the bolt is released the door support with the door carried thereby can swing downwardly to an approximately vertical position so as to permit discharge of the chamber contents.

Figure 1:
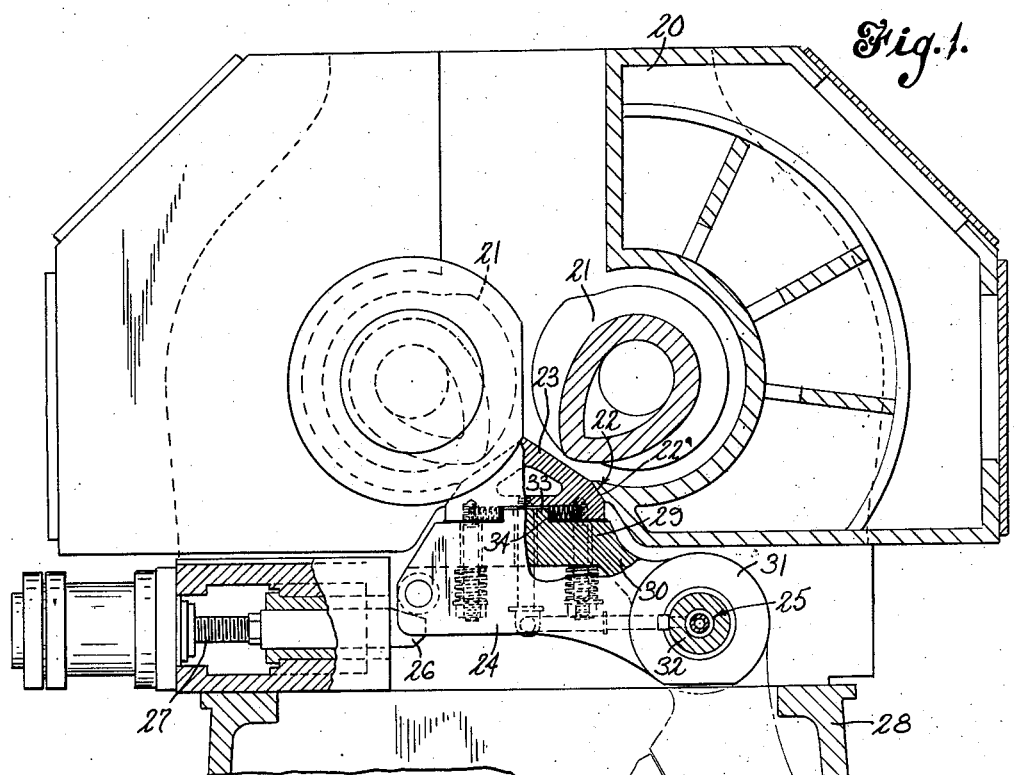
Fig. 1 is a lateral elevation with parts broken away of a mixer embodying the invention, the door being in the closed position.
Figure 3:
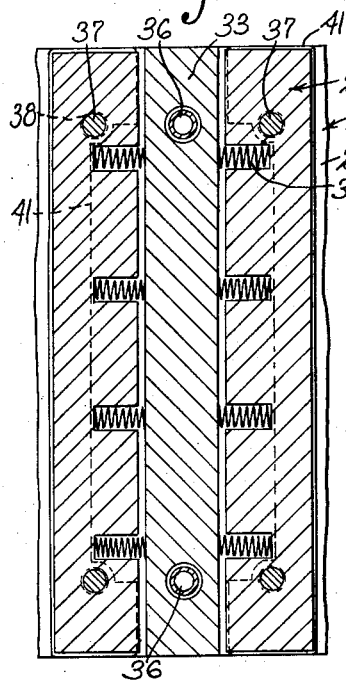
Fig. 3 is a section on line 3—3 of Fig. 2.

In the form shown in Figs. 1, 2 and 3, the casing providing the mixing chamber is indicated at 20, the rotors at 21, the discharge opening or doorway below the rotors at 22, the door in the form of an inverted V at 23, the door-supporting member at 24, the pivotal axis of the member 24 at 25, the locking bolt for the door-support assembly at 26, the power member for actuating member 26 at 27, and the supporting base for the mixer at 28. In Fig. 1, the door-support assembly is shown in full lines in the closed position and in broken lines in the open, depending position.

It will be noted from Fig. 2 that the door 23 has near the base thereof, beveled face portions at the sides which are adapted to engage beveled edges of the door opening 22. The door support 24 has a flat upper portion 29 supporting the door in the manner to be hereinafter described, and at one side this flat portion 29 is integrally connected to a downwardly sloping portion 30 provided with a terminal 31 of ring-like section by means of which the arm structure serving as a door support is pivoted to the pivot member 32. The pivot member 32 serves as a rock shaft that is turned by a suitable prime mover to move the door-support assembly between open and closed positions. Any preferred prime mover (not shown) can be employed for this purpose. At the upper part of the portion 29 of the door support there is provided an integral upstanding rib 33 located under and facing the bottom of the door. This rib 33, as shown in Fig. 3, serves as a support for a number of laterally directed helical springs 34 which exert lateral pressure on the door, there being a number of such springs at each side of the door. Each of these springs at one end presses against the rib 33 in one direction and against the depending marginal portion of the door in the opposite direction, the arrangement being such that normally the springs hold the door in the symmetrical relationship to the door support (and rib 33), shown in Figs. 2 and 3. The horizontally disposed springs have clearance between each of them and the adjacent upper and lower door-support portions, as shown in Fig. 2. Cooling conduits 36, extending through the rib 33, are connected with conduits connected with the lower part of the door support, as shown in Fig. 2.

As above stated, the springs 34 normally hold the door in symmetrical relationship to the door support (and its rib 33) but the door and door support can have lateral movement relatively to each other enabling the door to assume an asymmetrical position. The mounting of the door upon the bed-like part of the swinging arm is of a character to permit this, that is, relative movement of the door toward the right or toward the left of the median position (Fig. 2). In this particular case, the door is held on the support and permitted a certain amount of lateral movement by fastening or hold-down bolts that are secured to the door and pass with lateral clearance through bores in the door support. In this particular case there are four bolts 37, the upper ends of which are screwed into the door from beneath and have lower ends projecting downwardly through clearance openings 38 in the support, the diameter of such openings being somewhat greater than the bolt diameter. The lower ends of the bolts extend downwardly from the support portion 29 and on the lower ends of the bolts helical springs 39 are provided, said springs pressing upwardly against the door bed and downwardly against washers supported by adjusting nuts 40 on the lower ends of the bolts. The springs 39 press the door downwardly into frictional contact with the support with a regulable amount of force. The greater the force, the greater will be the resistance to the movement of the door relatively to its support. If desired, strips of low friction material, such as nylon, indicated at 41, may be interposed between the side marginal portions of the door at its lower face and the opposing portions of the door bed, these strips being secured to one or the other of the two members, said strips serving to protect the opposing portions of the two members.

It is believed that the action of the above-described structure in closing the mixing chamber against leakage and in opening the chamber for discharge purposes will be clear from the foregoing description, the door being capable of a cushioned and limited sliding movement and for a lateral pivoting movement relatively to its support, said door, when lifted to close the chamber opening, not being required to take a position in which it has symmetrical relationship to the support or to the opening nor to take a precisely horizontal position. The bevels 22ᵃ on the side faces of the door are shown (Fig. 2) to be at inclinations slightly different from those of the door opening. By the movement permitted between the door and its support the door can take a closed position in which each lateral margin can, in cooperation with the marginal part of the doorway, provide a seal against leakage.

The arrangement of the mounting bolts relatively to the door and door support and also the arrangement of the springs normally holding the door in symmetrical position in relationship to its support are relatively simple and inexpensive and there is also facility in making adjustments for giving the door a securely closed position if, initially, there may be escape of material from the chamber.

Figure 4:
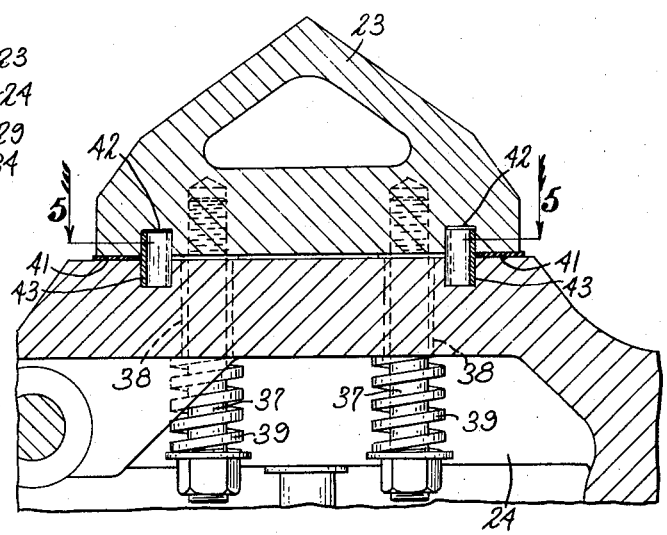
Fig. 4 is a transverse section showing a door and door-support assembly of modified form.
Figure 5:
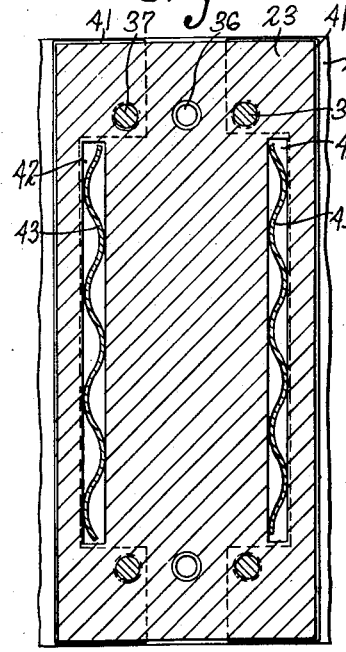
Fig. 5 is a section on line 5—5 of Fig. 4.

In the modified form shown in Figs. 4 and 5, the principal differences relate to the form and arrangement of springs normally holding the door in the position in which its longitudinal axis substantially coincides with that of the door support. Here the bolts are similar to those above described, and strips of low friction material are interposed between the door and door support. However, the median rib on the support is eliminated and the springs are leaf springs occupying facing grooves in the two members. The grooves are indicated at 42, these grooves being at opposite sides of the axis of the door member and taking up a considerable part of the length of said member. The springs are indicated at 43, these springs being leaf springs that are crenellated so as to present portions alternately engaging opposite sides of the grooves. As will be apparent from Fig. 4, the grooves in the bed and those in the door are of substantially the same depth and the height of the springs is only slightly less than the corresponding dimension of the receiving groove, there being a certain amount of clearance in a vertical direction. Each spring bears, at certain points, against the marginal portion of the door and against the supporting bed, tending to press the door in one direction, and in other locations in the groove the pressure is in the opposite direction. As in the form first described, the supporting bolts permit limited lateral movement of the two parts, and as in the first form, the mounting bolts permit, in addition to a lateral slide, a slight swinging movement in a generally horizontal plane in which one end portion of the door is swung laterally with respect to the other end, the connecting bolts at one end of the door serving as a pivotal support for the movement.

Figure 6:
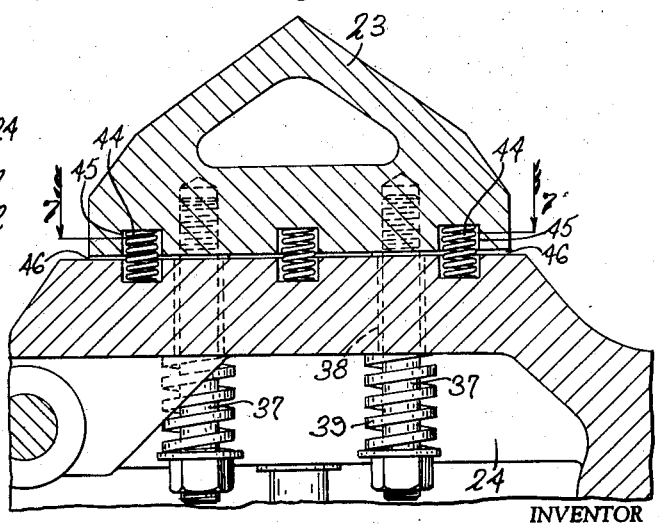
Fig. 6 is a section similar to Fig. 4 showing another modified form.

Figs. 6 and 7 show another modification in which connecting bolts similar to the previously described bolts are employed. In this case, however, helical springs 44 interposed between the door and the bed are held in individual cylindrical sockets 45, each of said sockets having parts thereof in the respective members. These sockets are of sufficient diameter to enable the door to be moved in any horizontal direction relatively to the supporting bed and any such movement is permitted by the connecting bolts which, as in forms previously described, have lateral clearance in enlarged bores in the bed. By tightening the springs on the connecting bolts the helical springs 44 can be preloaded to the desired extent. Moreover, it is to be noted that in this form, movement of the door in any generally horizontal direction is facilitated owing to the fact that a clearance space, indicated at 46, is left between the lower surface of the door and the upper surface of the bed where it opposes the door. In this instance this gap or clearance space is located at the lower surface of the door except for the areas taken up by the connecting bolts and similar members. This is another form in which the door has a limited movement in any substantially horizontal plane relative to its support in order to facilitate positioning of the door in a sealing position.

Figs. 8 and 9 show another form similar in some respects to the one just described. Here the lower pressure springs on the connecting bolts are omitted and the only springs used are located in sockets in the bed. These sockets are indicated at 47 and the springs located therein at 48, said springs embracing the connecting bolts 49. The upper threaded ends of the bolts 49 screw into the door at the bottom of the latter and the bolts extend through the sockets 47 and through clearance holes 50 in the bed extending from the sockets to the lower face of the bed. The lower threaded ends of the bolts are equipped with nuts 51 which are tightened to abut the lower face of the bed. The springs tend to raise the door from the bed and there is a clearance or gap 52 between the lower face of the door and the upper face of the bed, as in the form of Fig. 6. In this last form the number of connecting bolts is increased, there being in this instance eight spring-equipped connecting bolts. Upon closing the door the gap 52 will be closed but, as in the form of Fig. 6, substantially horizontal lateral sliding or swinging movement for positioning of the door may take place.

Figure 11:
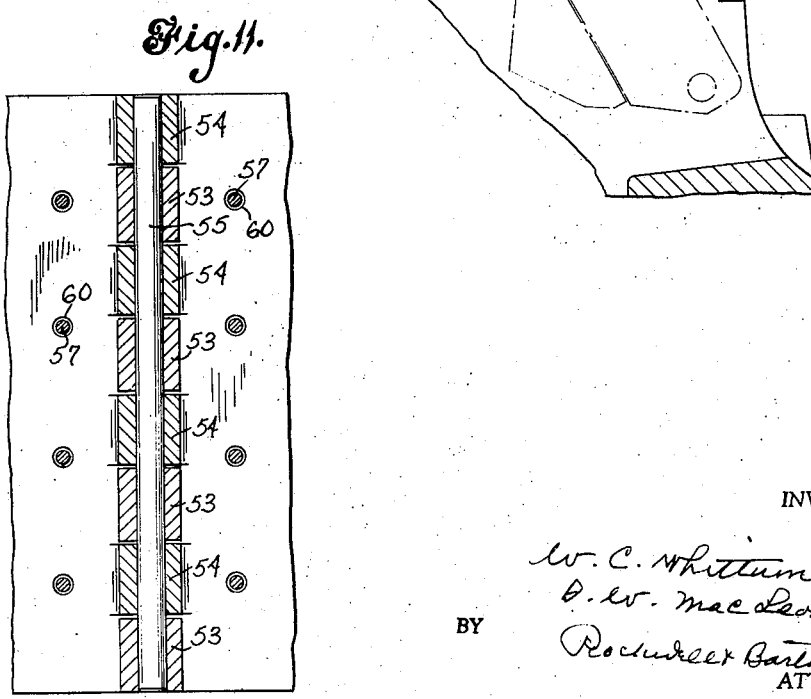
Fig. 11 is a section on line 11—11 of Fig. 10.

In the form shown in Figs. 10 and 11, connecting bolts similar to those previously described are employed but these are used in a structure in which there is a pivotal connection between the door and the bed. The door is provided at its longitudinal center line with a series of downwardly projecting knuckles 53 alternating with similar upstanding knuckles 54 provided on the bed. Through these knuckles extends a pivot pin 55. The arrangement is such that the door can tilt in a vertical transverse plane to a limited extent, and to permit this a clearance space or gap 56 is provided between the bottom of the door and the upper face of the door bed. The connecting bolts 57 have their upper ends screwed into the door and sockets 58 contain helical springs 59 surrounding the bolts within the lines of the door. The bolts extend with clearance through bores 60 in the bed and at their lower ends springs surrounding the bolts and adjustable by adjusting nuts are adapted to preload the springs 59. In this form the door can have a swinging or tilting movement within limits with respect to the supporting bed but the movement is in a generally vertical plane. This is another instance, however, where tilting or swinging movement of the door and support relatively to each other is controlled to the end that escape of material from the mixing chamber is effectively inhibited or prevented.

All of the forms herein shown are suitable for inhibiting escape of material from the mixer chamber, and, more particularly, they are intended to meet the condition where, one of the lateral margins of the door being the first to reach and contact the corresponding margin of the door opening, the door can shift relatively to its support or bed in such a direction and in such a manner as to seal the door opening when or shortly after, at a succeeding stage, the other margin of the door enters the door opening.

Various modifications and changes in the details may be made without departing from the principles of the invention and the scope of the claims.

What we claim is:

1. In a mixer for rubber and like material having a lower discharge opening in the mixing chamber, a closure door for said opening having in transverse section the shape of an inverted V and adapted to be moved upwardly into said discharge opening, a door support beneath said door movable toward and from said opening and having an upper surface upon which the door is carried, and means mounting said door on said support and interconnecting the door and support so that said door is shiftable transversely with respect to said support in a direction substantially parallel to said surface, said door and support presenting a structure having spring sockets and springs disposed in said sockets for controlling relative movement of the door and its supporting member.

2. In a mixer for rubber and like material having a lower discharge opening in the mixing chamber, a closure door for said opening having in transverse section the shape of an inverted V and adapted to be moved upwardly into said discharge opening, a door support beneath said door movable toward and from said opening and having an upper surface upon which the door is carried, and means mounting said door on said support and interconnecting the door and support so that said door is shiftable transversely with respect to said support in a direction substantially parallel to said surface, said means including springs supported in sockets of the door-and-support structure and pressing the door in a substantially horizontal plane relatively to its support.

3. In a mixer for rubber and like material having a lower discharge opening in the mixing chamber, a closure door for said opening having in transverse section the shape of an inverted V and adapted to be moved upwardly into said discharge opening, a door support beneath said door movable toward and from said opening and having an upper surface upon which the door is carried, and means mounting said door on said support and interconnecting the door and support so that said door is shiftable transversely with respect to said support in a direction substantially parallel to said surface, said means including springs supported in sockets of the door-and-support structure and pressing the door in a substantially horizontal plane relatively to its support, said springs being located at opposite sides of the longitudinal median line of the door.

4. The structure defined in claim 3 in which the door support is provided with a rib on its upper surface and said springs are horizontally disposed coils abutting said rib on the door support.

5. The structure defined in claim 3, in which said springs are crenellated leaf springs disposed in sockets constituted by grooves formed partly in the underneath portion of the door and partly in the upper face portion of the door support.

6. A door and door-support assembly for mixers having a closure door of inverted V-shape in transverse section, a door support having a bed underlying said door, and means mounting said door on said bed for movement generally parallel to the bed, said means comprising upstanding bolts threaded into the door and having lower ends extending downwardly through enlarged bores in the bed, the lower ends of said bolts having nuts threaded thereon, said bolts being embraced by helical springs disposed in sockets in the bed, which springs press the door upwardly so that normally there is a clearance space or gap directly between the upper face of the bed and the lower face of the door.

7. A door and door-support assembly for rubber and like mixers comprising a closure door which in transverse section is of inverted V formation, a door support providing a bed underlying said door, and means mounting said door on said bed for movement in a substantially horizontal plane so that the door can move laterally relatively to the bed, said means including hold-down bolts secured at their upper ends in the lower portion of the door and extending through clearance bores in the bed and equipped below the bed with upwardly pressing spring coils, and vertically disposed coil springs around said bolts above the bed pressing the door upwardly so that normally there is a clearance space or gap between the bed and the door.

8. The assembly of claim 6 in which said helical springs are disposed in sockets in the upper face of the bed.

9. A door and door-support assembly for mixers having a closure door of inverted V-shape in transverse section, a door support having a bed underlying said door, upstanding bolts threaded into the door and having lower ends extending downwardly through enlarged bores in the bed, the lower ends of said bolts having nuts threaded thereon, and springs interposed directly between the lower portion of the door and the upper portion of the bed, said springs pressing the door upwardly so that there is a clearance space or gap directly between the upper face of the bed and the lower face of the door.

10. The structure of claim 9, in which said springs are vertically disposed helices and wherein said nuts engage the lower surface of said bed.

11. A door and door-support assembly for rubber and like mixers, comprising a closure door with lateral sealing edges, a door support providing a bed underlying said door, said door being pivoted between its side margins to said bed to swing in a vertical plane, hold-down bolts secured at their upper ends to the lower portion of the door and extending through clearance bores in the bed and equipped below the bed with upwardly pressing spring coils, and vertically disposed coil springs embracing said bolts above the bed pressing the door upwardly.

References Cited in the file of this patent

UNITED STATES PATENTS

| | | |
|---|---|---|
| 1,846,720 | Guild | Feb. 23, 1932 |
| 2,181,224 | Campbell et al. | Nov. 28, 1939 |
| 2,801,035 | Hertrich | July 30, 1957 |